United States Patent
Landais et al.

(10) Patent No.: US 9,832,248 B2
(45) Date of Patent: Nov. 28, 2017

(54) DEVICE AND METHOD FOR SWITCHING FROM A FIRST DATA STREAM TO A SECOND DATA STREAM

(71) Applicant: SAGEMCOM BROADBAND SAS, Rueil-Malmaison (FR)

(72) Inventors: Thomas Landais, Rueil-Malmaison (FR); Jean-François Legros, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 39 days.

(21) Appl. No.: 14/650,404

(22) PCT Filed: Dec. 4, 2013

(86) PCT No.: PCT/EP2013/075454
§ 371 (c)(1),
(2) Date: Jun. 8, 2015

(87) PCT Pub. No.: WO2014/090643
PCT Pub. Date: Jun. 19, 2014

(65) Prior Publication Data
US 2015/0312304 A1    Oct. 29, 2015

(30) Foreign Application Priority Data
Dec. 11, 2012    (FR) ..................... 12 61880

(51) Int. Cl.
G06F 15/16 (2006.01)
H04L 29/06 (2006.01)
H04H 20/22 (2008.01)

(52) U.S. Cl.
CPC ........... *H04L 65/602* (2013.01); *H04H 20/22* (2013.01); *H04L 65/80* (2013.01)

(58) Field of Classification Search
CPC ............... H04L 29/08072; H04L 29/06; H04L 29/0809
(Continued)

(56) References Cited

U.S. PATENT DOCUMENTS 6,415,326 B1    7/2002  Gupta et al.
2002/0116178 A1*  8/2002  Crockett ............... G10L 21/045
                                                                704/200.1
(Continued)

FOREIGN PATENT DOCUMENTS

EP    1 073 224 A2    1/2001
EP    1 233 556 A1    8/2002

OTHER PUBLICATIONS

"Hybrid Broadcast Broadband TV; ETSI TS 102 796; V1.1.1;" ETSI Standards; Jun. 2010; pp. 11-19; Abstract; XP055001426.
(Continued)

*Primary Examiner* — Alan S Chou
(74) *Attorney, Agent, or Firm* — Oliff PLC; R. Brian Drozd

(57) ABSTRACT

A device receives first and second data streams representing an audio and/or video content. The device is configured beforehand so as to disseminate the content from the first stream. Following a command for switching from the first stream to the second stream, the device determines by correlation a reference point in the first stream and in the second stream, and determines an offset in time from time-stamping information associated with the reference point in each of the first and second streams. Before switching, the device: pauses the second stream until the offset in time is absorbed when the offset in time indicates that the first stream is late; decreases a frame rate of the first stream until the offset in time is absorbed when the offset in time indicates that the first stream is in advance.

15 Claims, 2 Drawing Sheets

Figure 1:
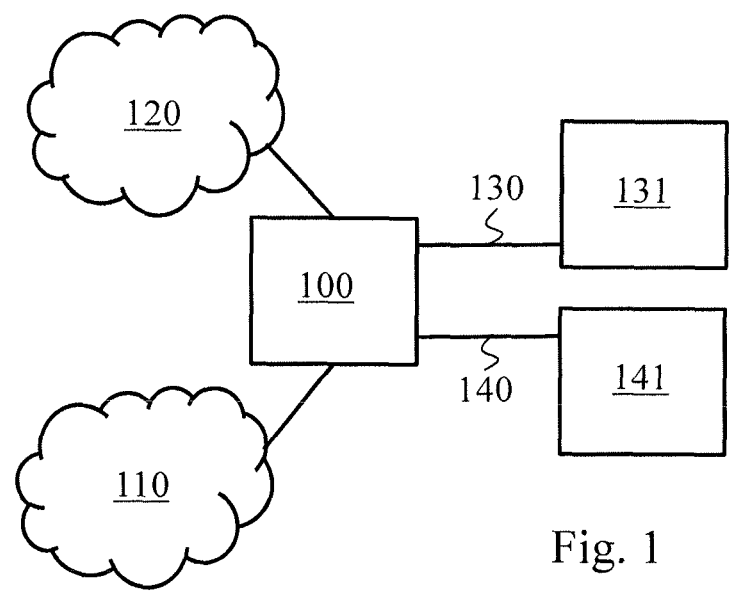

(58) Field of Classification Search
USPC ........................................................ 709/219
See application file for complete search history.

(56) References Cited

U.S. PATENT DOCUMENTS

| | | | | |
|---|---|---|---|---|
| 2003/0212997 | A1* | 11/2003 | Hejna, Jr. ........ | H04N 21/47217 |
| | | | | 725/88 |
| 2006/0193388 | A1* | 8/2006 | Woods ................. | H04N 19/647 |
| | | | | 375/240.16 |
| 2009/0307367 | A1* | 12/2009 | Gigliotti ................. | G06F 15/16 |
| | | | | 709/231 |
| 2011/0149753 | A1 | 6/2011 | Bapst et al. | |
| 2013/0331972 | A1* | 12/2013 | Sagne ................. | G06F 17/3074 |
| | | | | 700/94 |

OTHER PUBLICATIONS

Mar. 7, 2014 Search Report issued in International Application No. PCT/EP2013/075454.

* cited by examiner

DEVICE AND METHOD FOR SWITCHING FROM A FIRST DATA STREAM TO A SECOND DATA STREAM

The present invention relates to switching from a first data stream to a second data stream in the context of disseminating an audio and/or video content.

With the increase in networks broadcasting audio and/or video contents in live streaming mode, it is not rare for the same device to be adapted for receiving, by a first means, a first data stream representing an audio and/or video content and, by second means, a second data stream representing the same audio and/or video content. For example, a same decoding device may receive the same television channels from two broadcasting networks, such as cable and satellite. Such a decoder is then equipped with two tuners, which it is necessary to manage suitably. Indeed, since these two tuners may provide, at least for some contents, data streams with different characteristics, such as for example different resolutions, and/or because these tuners may capture different sets of television channels, it is necessary to carry out arbitration in their use.

Thus, when a device is adapted for receiving a first data stream representing an audio and/or video content and a second data stream representing the same audio and/or video content, the device may be caused to switch from one stream to the other. Since these streams are received or processed by different means, there typically exists a certain offset in time between these streams. Switching then from one to the other causes annoyance for a user who has his stream switched from one source to another, such as for example breaks in image and/or sound.

It is desirable to overcome these drawbacks of the prior art by providing a solution that enables performing such switching transparently or at least in a way that is little perceptible to the user.

The invention relates to a method implemented by a device for disseminating audio and/or video contents, said device receiving a first data stream representing an audio and/or video content and a second data stream representing the audio and/or video content, said device being beforehand configured so as to disseminate said audio and/or video content using the first data stream. The method is such that, following detection of a command for switching dissemination of the audio and/or video content from the first data stream to the second date stream, said device performs the following steps: determining by correlation a reference point of the audio and/or video content in the first data stream and in the second data stream; determining an offset in time between the first data stream and the second data stream using time-stamping information associated with said reference point in each of the first and second data streams. And, before switching from the first data stream to the second data stream, said device performs the following steps: pausing the second data stream until the offset in time is absorbed when the offset in time indicates that the first data stream is late with respect to the second data stream; decreasing a frame rate of the first data stream until the offset in time is absorbed when the offset in time indicates that the first data stream is in advance with respect to the second data stream. Thus, thanks to the management of the offset in time by pausing a stream or by decreasing the frame rate of the other stream, the switching is transparently performed (pausing) or at least in a way that is little perceptible (decrease in frame rate) for the user.

According to a particular embodiment, the second data stream is paused by rerouting the second data stream into a memory, said memory being activated in read mode as soon as the offset in time is absorbed.

According to a particular embodiment, when the data of the first and second streams are video or audiovisual data, the analysis by correlation is performed on the basis of luminance histograms of images in the first and second data streams.

According to a particular embodiment, when the data of the first and second streams are compressed data, said device performs, prior to the analysis by correlation, a data decompression step, and performs the analysis by correlation on the basis of the decompressed data.

According to a particular embodiment, when the data of the first and second streams are video or audiovisual data compressed by predictive coding, the device performs the decompression only on intra images.

According to a particular embodiment, when the data of the first and second streams are audio or audiovisual data, the analysis by correlation is performed by determining acoustic fingerprints on portions of the first and second data streams.

According to a particular embodiment, said device stores information representing the offset in time and uses said information in order to parameterise the analysis by correlation for a future switching between the first and second data streams.

According to a particular embodiment, when said device decreases the frame rate of the first data stream until the offset in time is absorbed, said device performs an audio processing on the data of the first stream in order to preserve the pitch thereof.

The invention also relates to a device for disseminating audio and/or video contents, said device comprising means for receiving a first data stream representing an audio and/or video content and a second data stream representing the audio and/or video content, said device being configured so as to disseminate said audio and/or video content using the first data stream. Following detection of a command for switching dissemination of the audio and/or video content from the first data stream to the second data stream, said device implements: means for determining by correlation a reference point on the audio and/or video content in the first data stream and in the second data stream; means for determining an offset in time between the first data stream and the second data stream using time-stamping information associated with said reference point in each of the first and second data streams. And, before switching from the first data stream to the second data stream, said device implements: means for pausing the second data stream until the offset in time is absorbed, when the offset in time indicates that the first data stream is late with respect to the second data stream; means for decreasing a frame rate of the first data stream until the offset in time is absorbed when the offset in time indicates that the first data stream is in advance with respect to the second data stream.

The invention also relates to a computer program that may be stored on a medium and/or downloaded from a communication network in order to read by a processor. This computer program comprises instructions for implementing the method mentioned above in any one of its variants when said program is executed by the processor. The invention also relates to storage means comprising such a computer program.

Figure 2:
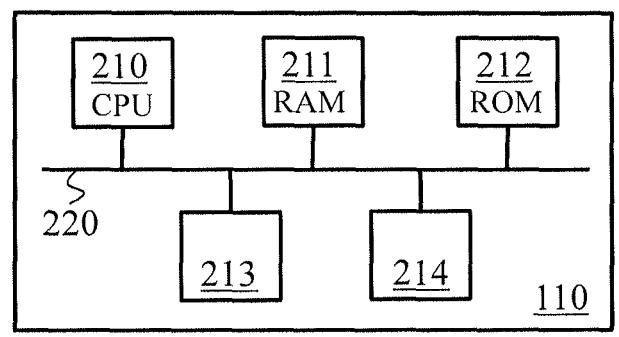
Figure 3:
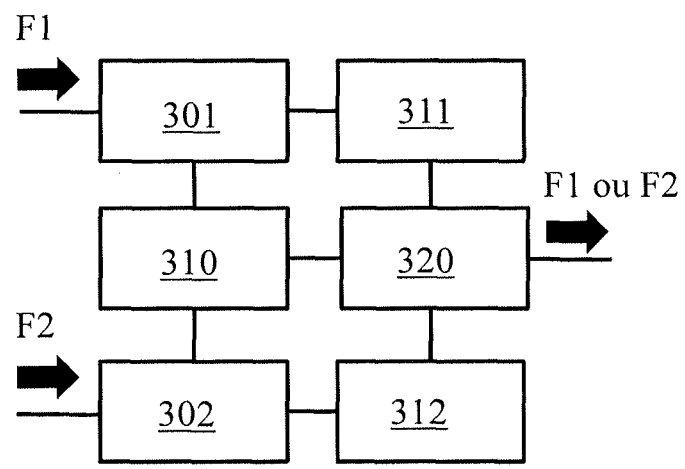
Figure 4:
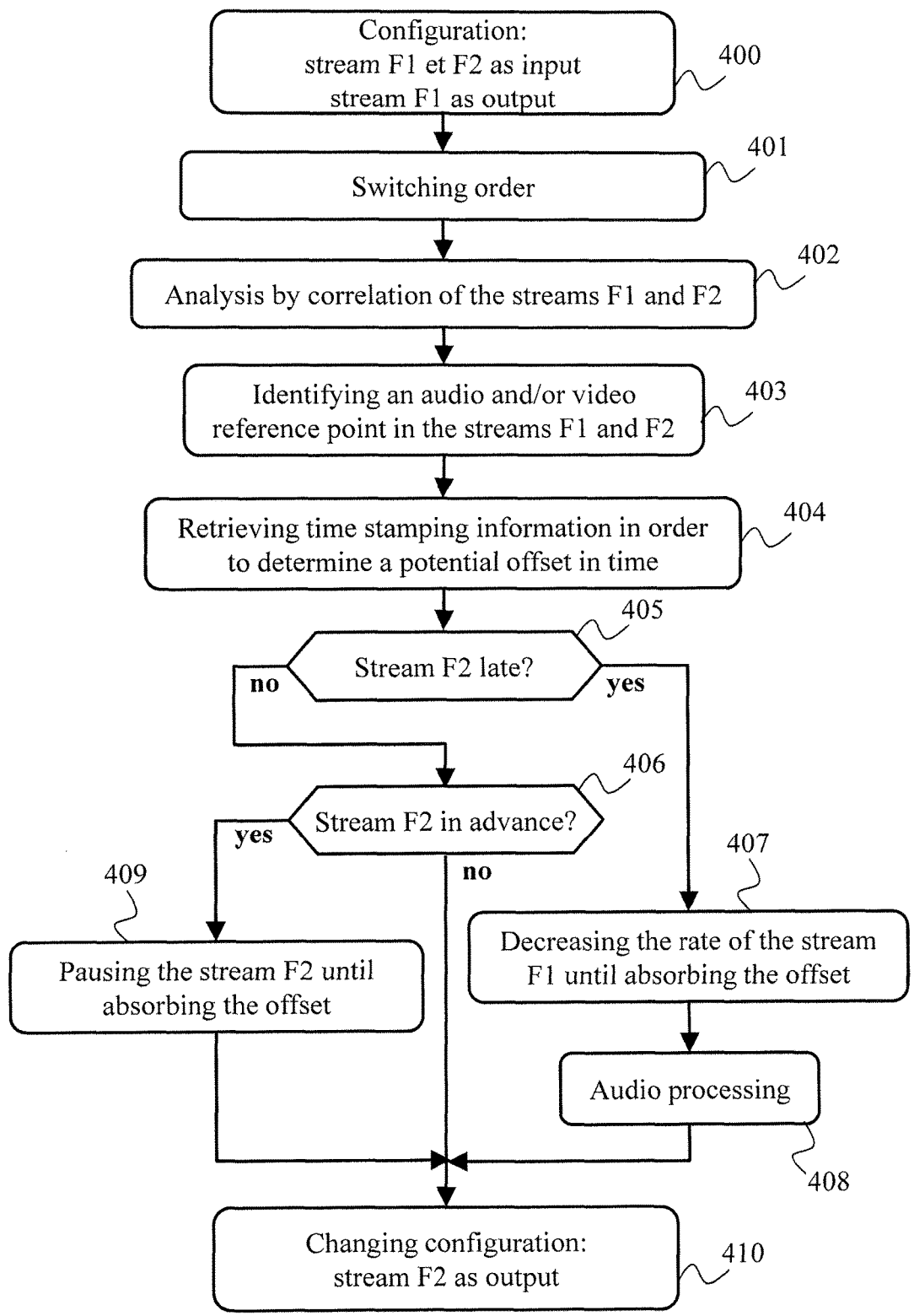

The features of the invention mentioned above, as well as others, will emerge more clearly from a reading of the following description of an example embodiment, said description being given in relation to the accompanying drawings, among which:

FIG. 1 schematically illustrates a system in which the present invention may be implemented;

FIG. 2 schematically illustrates an example of hardware architecture of a device of the communication system;

FIG. 3 schematically illustrates an example of modular division of at least part of the device;

FIG. 4 schematically illustrates an algorithm for managing the configuration of the device.

FIG. 1 schematically illustrates a system in which the present invention may be implemented.

The system of FIG. 1 comprises a device 100 connected to a first communication network 120, such as the Internet, and to a second communication network 110, such as a satellite network.

The device 100 is adapted for receiving, via the first 110 and second 120 networks, audio and/or video contents in the form of data streams broadcast continuously (live streaming). The device 100 is adapted for receiving audio and/or video contents via the first 110 and the second 120 networks simultaneously.

The device 100 is further connected via a link 130 to a first device 131 consuming audiovisual contents, such as a screen, via a link 140 to a second device 141 consuming audiovisual contents, such as digital recorder or another screen. In this regard, the device 100 is a device for disseminating audio and/or video contents. It should be noted that the links 130 and 140 may be wired or wireless.

When the device 100 receives an audio and/or video content via the first 110 and second 120 networks simultaneously, the device 100 therefore receives two data streams. These two data streams are generally offset in time since these two data streams do not follow the same propagation paths. The same would apply if the device 100 were to receive a data stream from a communication network and separate pre-processing operations, and therefore with separate latencies, were to be applied to this data stream in order to form two data streams injected into the device 100.

The data streams are preferably in a format defined by the MPEG group (Moving Picture Experts Group), such as for example the MPEG-2 format. The audio and/or video content as disseminated by the device 100 via the link 130 and/or the link 140 is either in the form of a decoded data stream, meaning decompressed, and therefore the device 100 comprises a corresponding decoder, or in the form of a stream of non-decoded data, meaning compressed, and therefore the consuming devices 131 and 141 comprise respectively corresponding decoders.

In the context of the invention, the device 100 is configured beforehand so as to disseminate the audio and/or video content using a first data stream from these two data streams. The behaviour of the device 100 following detection of a command for switching dissemination of the audio and/or video content from the first data stream to a second data stream from these two data streams is detailed below in relation to FIG. 4. A modular division of at least part of the device 100 for implementing this behaviour is detailed below in relation to FIG. 3.

FIG. 2 schematically illustrates an example of hardware architecture of the communication device 100. The device 100 then comprises, connected by a communication bus 220: a processor or CPU (Central Processing Unit) 210; a random access memory RAM 211; a read only memory ROM 212; a storage unit or a storage medium reader, such as an SD (secure digital) card reader or a hard disc drive HDD 213; and a set of interfaces 214 for receiving the audiovisual contents via the first 110 and second 120 networks and transmitting audiovisual contents via the first 130 and second 140 links.

The processor 210 is capable of executing instructions loaded into the RAM 211 from the ROM 212, from an external memory (not shown), from a storage medium, or from a communication network. When the communication device 110 is powered up, the processor 210 is capable of reading instructions from the RAM 211 and executing them. These instructions form a computer program causing implementation, by the processor 210, of all or some of the modules, algorithms and steps described below.

Thus all or some of the modules, algorithms and steps described below can be implemented in software form through execution of a set of instructions by a programmable machine, such as a DSP (digital signal processor) or a microcontroller. All or some of the algorithms and steps described below can be implemented in hardware form by a machine or a dedicated component, such as an FPGA (field-programmable gate array) or an ASIC (application-specific integrated circuit).

FIG. 3 schematically illustrates an example of modular division of at least part of the device 100.

The device 100 comprises a first reception module 301 adapted for receiving the first data stream, denoted F1 in FIG. 3, representing the audio and/or video content, and a second module 302 adapted for receiving the second data stream, denoted F2 in FIG. 3, representing the audio and/or video content. In a particular embodiment, the first 301 and second 302 reception modules comprise a tuner for selecting a data stream representing an audio and/or video content from a plurality of data streams broadcast continuously and representing audio and/or video contents.

The device 100 further comprises an arbitration module 320 for selecting from the first F1 and second F2 data streams and switching from the first data stream to the second data stream F2 following detection of an instruction to switch. The selected stream is thus transmitted by the arbitration module 320, for example via the link 130.

The device 100 also comprises a module 310 for determining by correlation a reference point of the audio and/or video content in the first data stream F1 and in the second data stream F2, connected to the first 301 and second 302 reception modules. The purpose of the module 310 for determining by correlation is to find the same image and/or the same sound in the first F1 and second F2 data streams. Thus the module 310 for determining by correlation finds a reference point in the audio and/or video content and determines an offset in time between the first data stream F1 and the second data stream F2, using time-stamping information associated with this reference point in each of the first F1 and second F2 data streams. The module 310 for determining by correlation then supplies information representing this offset in time to the arbitration module 320.

The device 100 also comprises a module 311 for decreasing the frame rate of the first data stream F1, which is interposed between the first reception module 301 and the arbitration module 320. Thus, when the offset in time indicates that the first data stream F1 is in advance with respect to the second data stream F2, the arbitration module 320 requires the module 311 to decrease the frame rate of the first data stream F1, until the offset in time is absorbed. The dissemination of the first data stream F1 is thus temporarily slowed, and then the arbitration module 320 can proceed with the switching from the first data stream F1 to the second data stream F2.

The device 100 also comprises a module 312 for pausing the second data stream F2, which is interposed between the first reception module 301 and the arbitration module 320. This principle is referred to as time shifting. Thus, when the offset in time indicates that the first data stream F1 is late with respect to the second data stream F2, the arbitration module 320 requires the module 312 to pause the data stream F2 until the offset in time is absorbed. The pausing of the second data stream F2 is achieved by rerouting the second data stream F2 into a memory, which is activated in read mode as soon as the offset in time is absorbed. Thus any data item in the stream F2 written at a time T is made available to the arbitration module 320 only at a time T+D, where D represents the offset in time between the first F1 and second F2 data streams. Then, the arbitration module 320 can proceed with the switching from the first data stream F1 to the second data stream F2.

FIG. 3 considers the case of a switching from the first data stream F1 to the second data stream F2. If switching in the other direction were also to be allowed, the module 311 would also have to comprise a function of pausing the first data stream F1, and the module F2 would also have to comprise a function of decreasing the frame rate of the second data stream F2.

FIG. 4 schematically illustrates an algorithm for managing configuration of the device 100.

In a step 400, the device 100 is configured so that the device 100 receives the first F1 and second F2 data streams representing the audio and/or video content. The device 100 is also configured so that the device 100 disseminates, for example via the link 130, the first data stream F1 or a decompressed version of the first data stream F1. In the context of the modular division in FIG. 3, such a configuration is applied by the arbitration module 320.

In a step 401, the device 100 detects an instruction to switch dissemination from the first data stream F1 to the second data stream F2. For example, the first data stream F1 issues from a tuner for receiving a first set of television channels, the second data stream F2 issues from a tuner for receiving a second set of television channels, and the tuner from which the first data stream F1 comes must be released in order to enable another consuming device to receive a television channel solely present in the first set of television channels.

In a step 402, the device 100 analyses by correlation the data in the stream F1 and in the stream F2, or data issuing from a decoding of the stream F1 and of the stream F2. In the context of the modular division in FIG. 3, such an analysis by correlation is performed by the module 310.

In a particular embodiment, the audio and/or video data of the first F1 and second F2 streams being obtained from a same digitisation or encoding operation, these audio and/or video data are assumed to be identical, when they correspond to the same portion of the audio and/or video content. The analysis by correlation consists of locating in the second stream F2 (or in the first stream F1) at which position a predetermined set of data of the first stream F1 (or respectively of the second stream F2) is situated.

In another particular embodiment, the device 100 may also select audio and/or video data of the first stream F1 (or of the second stream F2), as an image, and seek, in the second stream F2 (or respectively in the first stream F1), data having a correlation level above a predefined threshold.

In yet another particular embodiment, the device 100 may also select audio and/or video data of the first stream F1 (or of the second stream F2), as an image, and seek, in the second stream F2 (or respectively in the first data stream F1), data having the highest correlation level among a set of data. This enables managing the case where the data of the first F1 and second F2 streams are not obtained by a same digitisation and encoding operation, or if noise has been inserted in the data of at least one of the data streams F1 and F2.

In yet another particular embodiment, when the data of the first F1 and second F2 streams are video data or audiovisual data, the device 100 may make the analysis by correlation on the basis of luminance histograms of the images of the first F1 and second F2 data streams.

In yet another particular embodiment, when the data of the first F1 and second F2 streams are audio or audiovisual data, the device 100 may use the Dynamic Time Wraping (DTW) algorithm in order to measure similarities in the audio data.

In yet another particular embodiment, when the data of the first F1 and second F2 streams are audio or audiovisual data, the analysis by correlation is made by determining acoustic fingerprints on portions of the first F1 and second F2 data streams. The device 100 determines a first acoustic fingerprint corresponding to a predefined duration of the content for the first data stream F1 (or the second data stream F2) and determines a second acoustic fingerprint for various sets of data of the second stream F2 (or respectively of the first stream F1) corresponding to the same predefined duration. An acoustic fingerprint is a deterministic digital summary of an audio signal. The first acoustic fingerprint acts as a reference and the device 100 uses a sliding window on the data of the second stream F2 in order to compare the second acoustic fingerprint with the first acoustic fingerprint until a correlation level above a predefined threshold is obtained. The determination of such fingerprints involves for example a detection of frequency peaks and a determination of difference between these frequency peaks in a simplified spectrogram of the audio content.

In yet another particular embodiment, the audio and/or video data of the first F1 and second F2 streams being encoded in a compression format, the device 100 proceeds first with a corresponding decompression of at least some of the audio and/or video data of the first F1 and second F2 streams to enable the operation of analysis by correlation to be performed. When the data of the first F1 and second F2 streams are video data or audiovisual data encoded by predictive coding, the device 100 may perform this decoding operation only on the images with internal coding, meaning the intra images, and not perform this decoding operation only on the images with predictive coding, meaning the inter images.

In a step 403, by virtue of the operation of analysis by correlation, the device 100 determines a reference point of the audio and/or video content in the first data stream F1 and in the second data stream F2.

In a step 404, the audio and/or video data of the first F1 and second F2 streams being associated with time-stamping information, the device 100 determines an offset in time between the first data stream F1 and the second data stream F2 using time-stamping information associated with the reference point in each of the first F1 and second F2 data streams. When the data of the first F1 and second F2 streams are video data or audiovisual data encoded according to an MPEG format, the time-stamping information may represent instants at which the corresponding audio and/or video data must be adopted by a decoder and are referred to as DTS (Decode Time Stamp), or represents instants at which the corresponding audio and/or video data must be presented to a consuming device and are referred to as PTS (Presentation Time Stamp).

In a particular embodiment, the device 100 stores information representing the offset in time, and determines and uses this information to parameterise the analysis by correlation for a future switching between the first F1 and second F2 data streams. The information stored defines for example the starting point of the analysis by correlation during this future switching.

In a step 405, according to the determined offset in time, the device 100 determines whether the second data stream F2 is late with respect to the first data stream F1. If such is the case, a step 407 is performed; otherwise a step 406 is performed.

In the step 406, according to the determined offset in time, the device 100 determines whether the second data stream F2 is in advance with respect to the first data stream F1. If such is the case, a step 409 is performed; otherwise there is no offset in time and a step 410 is performed.

In the step 407, the second data stream F2 is late with respect to the first data stream F1. The device 100 then decreases the disseminating rate, referred to as frame rate, of the first data stream F1 until the offset in time is absorbed. The device 100 then modifies the time-stamping information of the data of the first data stream F1 accordingly, in particular the PTS information in the context of an MPEG stream. In the context of the modular division of FIG. 3, the arbitration module 320 requests the module 311 to activate the function of decreasing the frame rate of the second data stream F2 until the offset in time is absorbed. An optional step 408 may be performed or otherwise the step 410 is performed.

In the step 408, when the data of the first F1 and second F2 streams are audio or audiovisual data, the device 100 performs an audio processing on the data in order to preserve the pitch, meaning in order to prevent, because of the slowing down related to the decrease of the frame rate of the first data stream F1, the sound rendition being deeper. A phase vocoder may be implemented, using Flanagan, Griffin and Lim, Laroche and Dolson or Roebel algorithms. An algorithm of the SOLA (Synchronised OverLap-Add) type may be implemented, thus limiting the consumption of the processing resources in order to preserve the pitch. The audio processing is applied until the offset in time is absorbed. Then, the step 410 is implemented.

In the step 409, the second data stream F2 is in advance with respect to the first data stream F1. The device 100 then pauses the second data stream F2 until the offset in time is absorbed. As already mentioned, one refers to time shifting. In the context of the modular division in FIG. 3, the arbitration module 320 requests the module 312 to activate the function of pausing the second data stream F2 until the offset in time is absorbed. Then, the step 410 is implemented.

In the step 410, the device 100 switches into a configuration such that the device 100 disseminates, for example via the link 130, the second data stream F2 or a decompressed version of the second data stream F2. In the context of the modular division in FIG. 3, such a configuration is applied by the arbitration module 320.

The invention claimed is:

1. A method implemented by a device for disseminating video or audiovisual contents, said device receiving a first data stream representing a video or audiovisual content and a second data stream representing the video or audiovisual content, said device being configured beforehand to disseminate said video or audiovisual content using the first data stream, the method being such that, before switching from the first data stream to the second data stream, said device performs:

pausing the second data stream until the offset in time is absorbed when an offset in time indicates that the first data stream is late with respect to the second data stream;

decreasing a frame rate of the first data stream until the offset in time is absorbed when the offset in time indicates that the first data stream is in advance with respect to the second data stream, wherein, following detection of a command for switching dissemination of the video or audiovisual content from the first data stream to the second data stream, said device performs:

determining by correlation analysis a reference point in the video or audiovisual content in the first data stream and in the second data stream, the correlation being made on the basis of luminance histograms of images in the first and second data streams; and determining the offset in time between the first data stream and the second data stream using time-stamping information associated with said reference point in each of the first and second data streams.

2. The method according to claim 1, wherein pausing the second data stream is done by rerouting the second data stream into a memory, said memory being activated in read mode as soon as the offset in time is absorbed.

3. The method according to claim 1, wherein, when the data of the first and second streams are compressed data, said device performs a data compression prior to determining by correlation analysis the reference point, and makes the correlation analysis on the basis of the decompressed data.

4. The method according to claim 3, wherein, when the data of the first and second streams are video or audiovisual data compressed by predictive coding, the device performs the decompression solely on intra images for the correlation analysis.

5. The method according to claim 1, wherein, when the data of the first and second streams are audiovisual data, the correlation analysis is performed by determining acoustic fingerprints on portions of the first and second data streams.

6. The method according to claim 1, wherein said device stores information representing the offset in time and uses said information to parameterise the correlation analysis for a future switching between the first and second data streams.

7. The method according to claim 1, wherein, when the data of the first and second streams are audiovisual data and when said device decreases the frame rate of the first data streams until the offset in time is absorbed, said device performs an audio processing on the data of the first stream in order to preserve the pitch thereof.

8. A device for disseminating video or audiovisual contents, said device comprising means for receiving a first data stream representing a video or audiovisual content and a second data stream representing the video or audiovisual content, said device being configured so as to disseminate said video or audiovisual content using the first data stream, the device being configured such that, before switching from the first data stream to the second data stream:

pausing the second data stream until the offset in time is absorbed, when an offset in time indicates that the first data stream is late with respect to the second data stream; and decreasing a frame rate of the first data stream until the offset in time is absorbed, when the offset in time indicates that the first data stream is in advance with respect to the second data stream, wherein, following detection of a command for switching dissemination of the video or audiovisual content from the first data stream to the second data stream:

determining by correlation a reference point in the video or audiovisual content in the first data stream and in the second data stream, the correlation being made on the basis of luminance histograms of images in the first and second data streams; and determining the offset in time between the first data stream and the second data stream using time-stamping information associated with said reference point in each of the first and second data streams.

9. A non-transitory storage means comprising a computer program, the computer program comprising instructions for implementing the method according to claim 1.

10. A non-transitory storage means comprising a computer program, the computer program comprising instructions for implementing the method according to claim 2.

11. A non-transitory storage means comprising a computer program, the computer program comprising instructions for implementing the method according to claim 3.

12. A non-transitory storage means comprising a computer program, the computer program comprising instructions for implementing the method according to claim 4.

13. A non-transitory storage means comprising a computer program, the computer program comprising instructions for implementing the method according to claim 5.

14. A non-transitory storage means comprising a computer program, the computer program comprising instructions for implementing the method according to claim 6.

15. A non-transitory storage means comprising a computer program, the computer program comprising instructions for implementing the method according to claim 7.

* * * * *